United States Patent [19]

Kawamata

[11] Patent Number: 5,719,789
[45] Date of Patent: Feb. 17, 1998

[54] METHOD OF AND APPARATUS FOR DETECTING AN AMOUNT OF DISPLACEMENT

[75] Inventor: Naoki Kawamata, Utsunomiya, Japan

[73] Assignee: Canon Kabushiki Kaisha, Tokyo, Japan

[21] Appl. No.: 531,056

[22] Filed: Sep. 20, 1995

[30] Foreign Application Priority Data

Sep. 22, 1994 [JP] Japan .................. 6-227732
Sep. 12, 1995 [JP] Japan .................. 7-234109

[51] Int. Cl.$^6$ .................. G01R 29/02; G01B 9/02
[52] U.S. Cl. .................. 364/561; 364/486; 364/571.01; 356/356; 356/358
[58] Field of Search .................. 364/561, 577, 364/486, 487; 356/356, 358; 33/701, 702, 501

[56] References Cited

U.S. PATENT DOCUMENTS

| | | | |
|---|---|---|---|
| 4,587,485 | 5/1986 | Papiernik | 324/166 |
| 4,618,940 | 10/1986 | Schmitt | 364/56 |
| 5,067,089 | 11/1991 | Ishii et al. | 364/486 |
| 5,121,116 | 6/1992 | Tamiguchi | 341/116 |
| 5,182,613 | 1/1993 | Ieki et al. | 356/374 |
| 5,202,842 | 4/1993 | Suzuki | 364/571.01 |
| 5,216,626 | 6/1993 | Kranitzky | 364/561 |
| 5,235,406 | 8/1993 | Ishii et al. | 356/358 |
| 5,287,166 | 2/1994 | Hosoe | 356/358 |
| 5,347,355 | 9/1994 | Eguchi | 356/356 |

FOREIGN PATENT DOCUMENTS

| | | | |
|---|---|---|---|
| 0085161 | 8/1983 | European Pat. Off. | G01D 5/244 |
| 0599175 | 6/1994 | European Pat. Off. | G91D 5/244 |
| 3231990 | 3/1984 | Germany | G08C 9/00 |
| 3737720 | 3/1989 | Germany | G01B 11/00 |

*Primary Examiner*—Emanuel T. Voeltz
*Assistant Examiner*—Bryan Bui
*Attorney, Agent, or Firm*—Fitzpatrick, Cella, Harper & Scinto

[57] ABSTRACT

This invention relates to a method of and an apparatus for detecting the amount of displacement of an object by the use of two periodic signals having a predetermined phase difference therebetween which are outputted in conformity with the displacement of the object. The apparatus has means for detecting the two periodic signals, means for calculating the ratio between the two periodic signals, and means for obtaining the amount of displacement of the object from the value of the ratio by reference to prestored data.

16 Claims, 12 Drawing Sheets

FIG. 1A
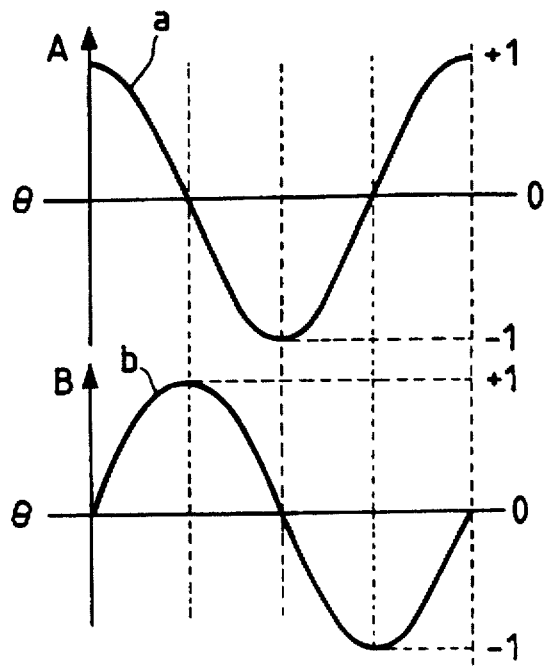
FIG. 1B
FIG. 1C
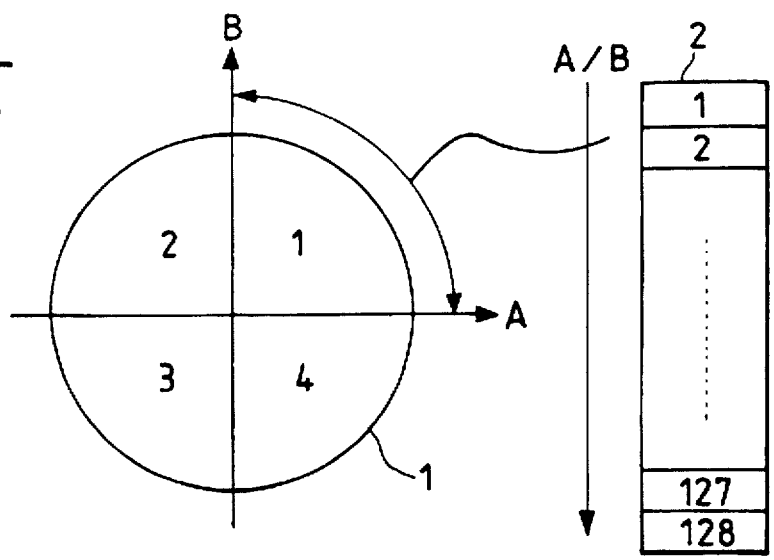

FIG. 13A

TABLE 1

| INTERSEC-TION POINT | 0.7660 | CROSSAB | ...... | DEG45 | ...... | 0.6428 |
|---|---|---|---|---|---|---|
| PHASE | 40 DEGREE | θc | ...... | π/4<br>45 DEGREE | ...... | 50 DEGREE |

FIG. 13B

TABLE 2

| PHASE ERROR δ | −5 DEGREE | ...... | 0 | ...... | 5 DEGREE |
|---|---|---|---|---|---|
| sin δ | −0.08716 | ...... | 0 | ...... | 0.08716 |

FIG. 13C

TABLE 3

| PHASE ERROR δ | −5 DEGREE | ...... | 0 | ...... | 5 DEGREE |
|---|---|---|---|---|---|
| cos δ | 0.9962 | ...... | 1.0 | ...... | 0.9962 |

METHOD OF AND APPARATUS FOR DETECTING AN AMOUNT OF DISPLACEMENT

BACKGROUND OF THE INVENTION

1. Field of the Invention

This invention relates to a method of and an apparatus for interpolating a periodic signal and detecting the amount of displacement of a position, an angle or the like more finely than a single period by the use of a detector generating a periodic signal in conformity with the displacement of a position or an angle.

2. Related Background Art

FIGS. 4A and 4B of the accompanying drawings show an example of an interpolation method for a position or angle signal according to the conventional art, and more particularly illustrates an interpolation method having interpolation data corresponding to a single period.

In FIG. 4A, the reference characters a and b designate two periodic signals differing in phase by 90° from each other, and more particularly position or angle signals obtained from a detector such as an encoder. The A-axis represents the amplitude value of the periodic signal a and the B-axis represents the amplitude value of the periodic signal b. Also, the axis of abscissas represents the rotational angle e of the detector. It is to be understood that these periodic signals are normalized and are vibrating within a range of ± about zero (0).

When as shown in FIG. 4B, the amplitudes of the periodic signals a and b are described with the B-axis and the A-axis taken as the axis of ordinates and the axis of abscissas, respectively, there can be described a circle 21 representative of a phase. The signal states of the periodic signals a and b are a=1 and b=0, respectively, and are the position of the point c of arrow. The phase rotates counter-clockwisely from this point c in accordance with the fluctuation of the signals.

A table 22 represents the arrangement of interpolation data when a period is divided into sixteen, and interpolation data corresponding to the phases of the signals are stored in advance therein. Numerals in the circle 21 indicate the order of areas in the 1/16 period, and the interpolation data fluctuate from 1 to 16 corresponding to the fluctuation of the signals. By this, a period of the signals can be interpolated into 16.

Numerals in the table 22 are a plurality of same numerals set in order to cope with the strain of the signals. When the table 22 is to be referred to from the values of the periodic signals a and b, the respective periodic signals are A/D-converted and the converted digital signals are used.

Description will now be made of a method of interpolating a period by interpolation data corresponding to 1/8 period.

FIG. 5 of the accompanying drawings shows an example of the interpolation method for a position or angle signal according to the conventional art, and more particularly illustrates a method of interpolating a period by interpolation data corresponding to 1/8 period.

In FIG. 5, a circle 31 represents a phase obtained from two periodic signals a and b, as in FIG. 4B, and numerals in the circle 31 each indicate what areas in 1/8 period when a phase corresponding to a single period is divided into eight.

If here, in the area in what 1/8 period the current phase is known, the whole of a period can be interpolated into the table storing interpolation data therein if only the interpolation data corresponding to 1/8 period is had.

A case where a single period is divided into 512 will hereinafter be described as an example.

To divide a single period into 512, use can be made of a table having interpolation data for subdividing, for example, areas divided into 8 into 64.

For example, when the current phase is in the third area, what number the area is first found, and then where the area is found by the use of the interpolation data in the table. If an interpolation value corresponding to the final value of the second area (128 if a period is divided into 512) is added to that value a correct interpolation value in a single period can be obtained.

Also, when the phase is in the second area, assuming a circle representing a phase having the A-axis as the axis of ordinates and the B-axis as the axis of abscissas, the table of the first area can be used. That is, if tentative data is obtained by the use of the table of the first area, whereafter the tentative data is subtracted from a value corresponding to the final value of the second area, a correct interpolation value in the second area can be obtained.

Specifically, assuming that in the case of the second area, the table of the first area is used and 50 has been obtained as the tentative value, the true interpolation value is 78(= 128-50).

In a similar manner, in the first, fifth and seventh areas, values 0, 256 and 384 are added to the interpolation data, and in the fourth, sixth and eighth areas, the tentative data is subtracted from values 256, 384 and 512, respectively, whereby the true interpolation value in a period can be obtained.

As described above, depending on in which of the areas divided into eight the phase is, addition or subtraction can be done to thereby interpolate all of a period.

The position or angle from a reference point can be found by adding the interpolation value obtained in the manner described above to a value N counted once each time zero (0) is crossed (one full rotation).

However, among the interpolation methods for a position or angle signal according to the conventional art as described above, in the method having interpolation data corresponding to a single period, a table having interpolation data corresponding to a period is referred to by the use of two periodic signals and therefore, the table becomes two-dimensional and a number of addresses for referring to the interpolation value becomes necessary. That is, the address capacity becomes approximately twice the number of interpolation data, and this leads to the problem that an attempt to increase the number of interpolation data would require a larger memory space.

On the other hand, the method of dividing a period into eight and finding the interpolation value in the area of 1/8 period, and thereafter adding or subtracting a predetermined value in conformity with the position of the area requires the process of adding or subtracting depending on the phase of the periodic signals and this leads to the cumbersomeness of the process and therefore, much time may be required for positioning and it may be required for positioning and it may become difficult to make the performance of the apparatus high.

In this method, unless the amplitudes are equal and the offset is zero, the result of interpolation will not be kept linear and sufficient accuracy will not be obtained. Unless in the vicinity of the boundary of interpolation, the phase difference is exactly 90°, the fluctuation of the position or angle and the result of interpolation will not be kept linear and sufficient accuracy will not be obtained.

SUMMARY OF THE INVENTION

The present invention has been made in order to solve the above-noted problems peculiar to the conventional art and an object thereof is to provide an interpolation method for a position or an angle in which the memory capacity of a reference table is reduced and which is simple in processing.

It is also an object of the present invention to provide an interpolation method which can cope with even the deviation of the amplitudes, offset and phase difference of signals from ideal values which must be considered in an actual encoder signal and is resultantly good in accuracy.

In order to achieve the above objects, one form of the displacement amount detecting method of the present invention is a displacement amount detecting method for detecting the amount of displacement of an object by the use of two periodic signals having a predetermined phase difference therebetween which are outputted in conformity with the displacement of the object, characterized by the steps of:

detecting the two periodic signals;
  calculating the ratio between the two periodic signals; and
  obtaining the amount of displacement of the object from the value of the ratio by reference to prestored data.

A preferred form of the displacement amount detecting method further has the step of making the amplitudes of the detected two periodic signals substantially equal to each other.

A preferred form of the calculating step has the step of replacing denominator and numerator with each other so that the ratio may be less than 1 in conformity with the magnitudes of the periodic signals.

A preferred form of the prestored data has data corresponding to ⅛ period of the periodic signals.

A preferred form of the displacement amount detecting method further has the step of correcting the phases of the two periodic signals into the predetermined pase difference.

A preferred form of the number of the prestored data is a power of 2.

One form of the displacement amount detecting apparatus of the present invention is a displacement amount detecting apparatus for detecting the amount of displacement of an object by the use of two periodic signals having a predetermined phase difference therebetween which are outputted in conformity with the displacement of the object, characterized by:

means for detecting the two periodic signals;
  means for calculating the ratio between the two periodic signals; and
  means for obtaining the amount of the object from the value of the ratio by reference to prestored data.

A preferred form of the displacement amount detecting apparatus further has means for making the amplitudes of the detected two periodic signals substantially equal to each other.

A preferred form of the calculating means has means for replacing denominator and numerator with each other so that the ratio may be less than 1 in conformity with the magnitudes of the periodic signals.

A preferred form of the prestored data has data corresponding to ⅛ period of the periodic signals.

A preferred form of the displacement amount detecting apparatus further has means for correcting the phases of the two periodic signals into the predetermined phase difference.

A preferred form of the number of the prestored data is a power of 2.

BRIEF DESCRIPTION OF THE DRAWINGS

FIGS. 1A, 1B and 1C show a first embodiment of an interpolation method for a position or angle signal according to the present invention, FIG. 1A being a signal graph, FIG. 1B being a state transition chart of signs, and FIG. 1C representing the table of phase and interpolation data.

FIGS. 13A, 13B and 13C are tables representing the relations between the point of intersection and the phase and between sine and cosine.

DESCRIPTION OF THE PREFERRED EMBODIMENTS

Some embodiments of the present invention will hereinafter be described with reference to the drawings.

Figure 1D:
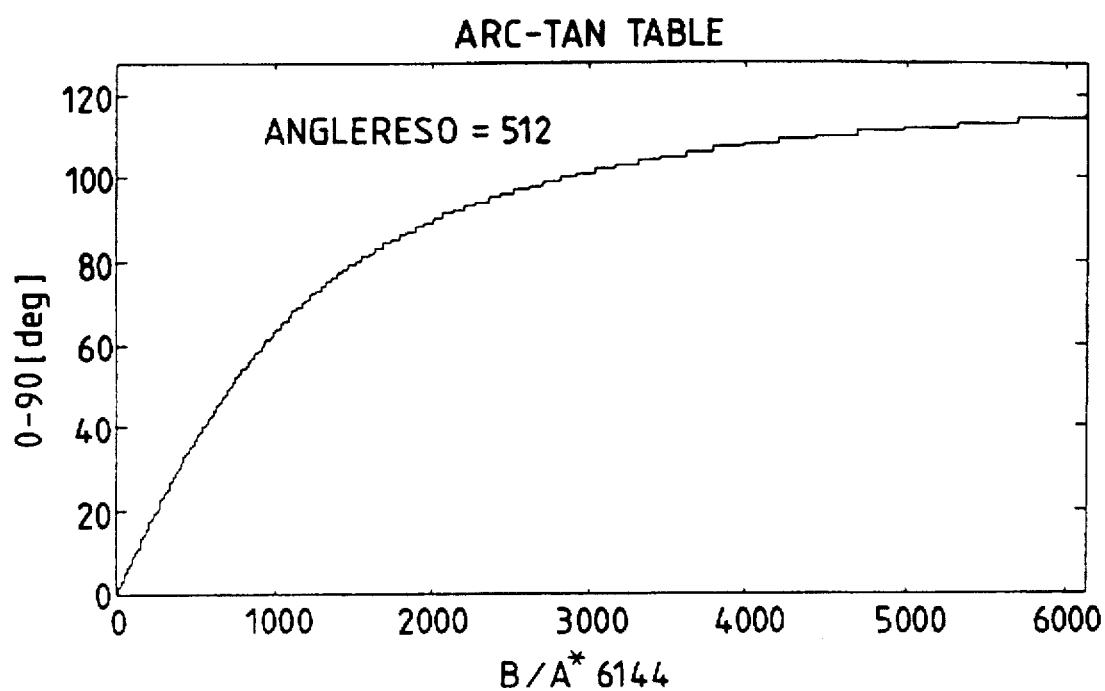
FIG. 1D represents the table of an interpolation value and an index.

FIGS. 1A to 1G show an embodiment of an interpolation method for a position or angle signal according to the present invention, FIG. 1A being a signal graph, FIG. 1B being a state transition chart of signs, and FIG. 1C representing the table of phase and interpolation data.

Figure 1E:
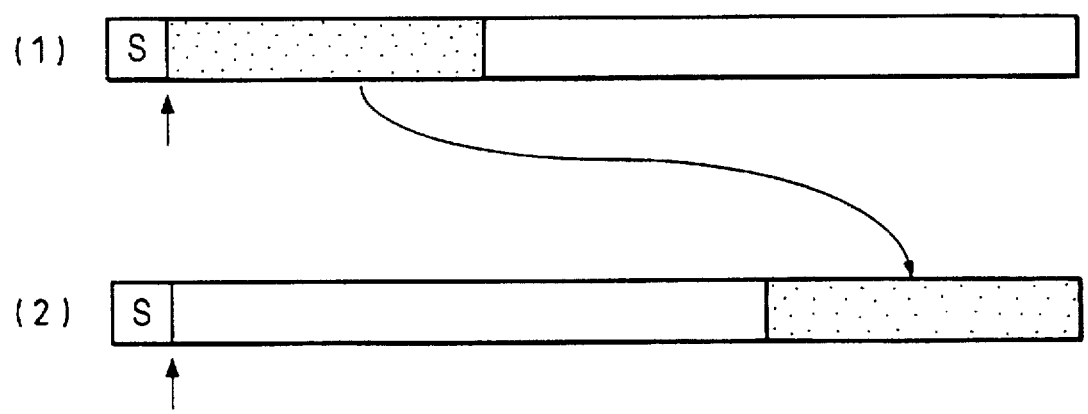
FIG. 1E shows a format.
Figure 1F:
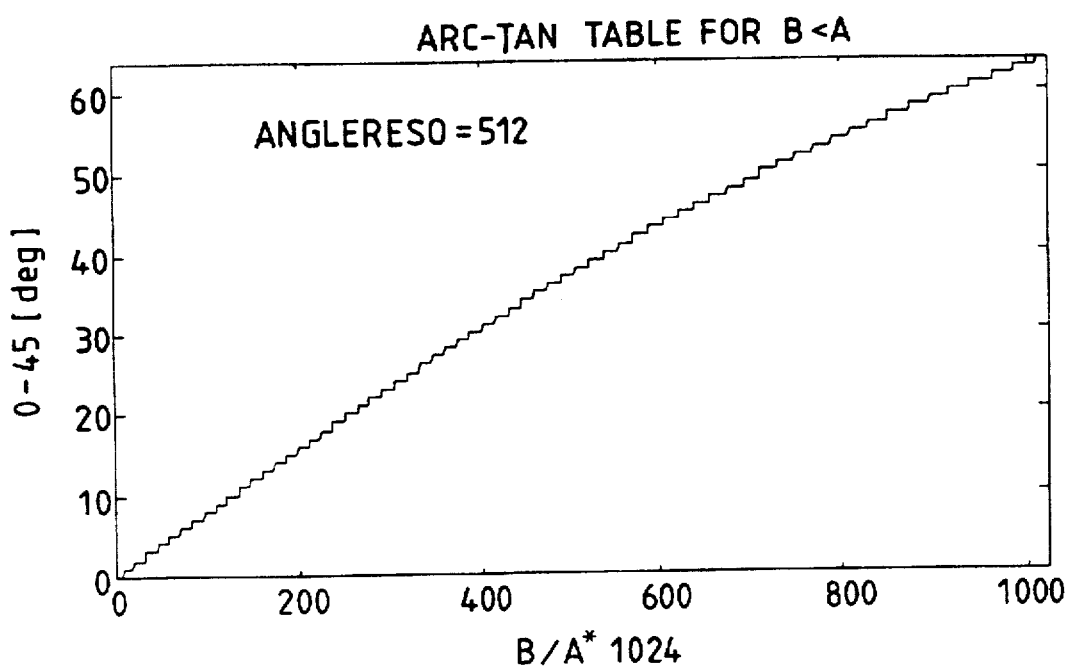
FIGS. 1F and 1G represent the tables of angles and indices.
Figure 1G:
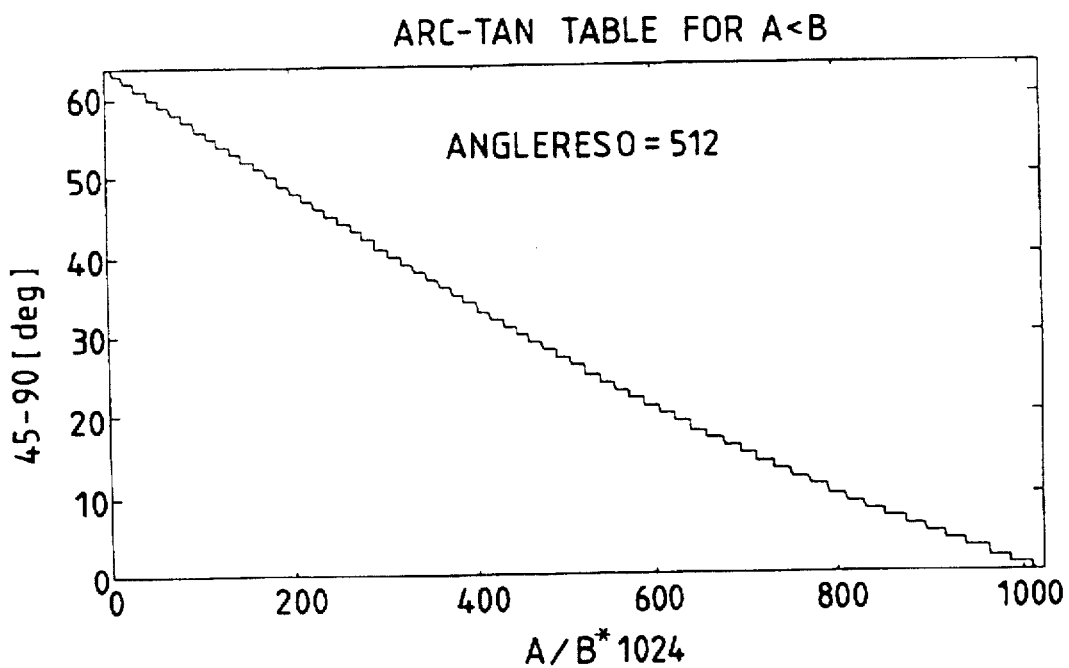
Figure 2A:
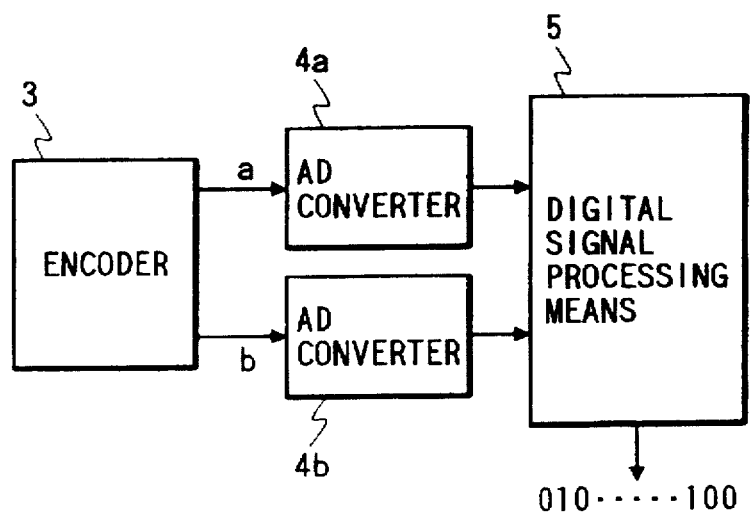
FIGS. 2A and 2B show a means for realizing the interpolation method for a position or angle signal shown in FIGS. 1A to 1G, FIG. 2A being a block diagram of an apparatus, and FIG. 2B representing the construction of a detection signal.
Figure 2B:
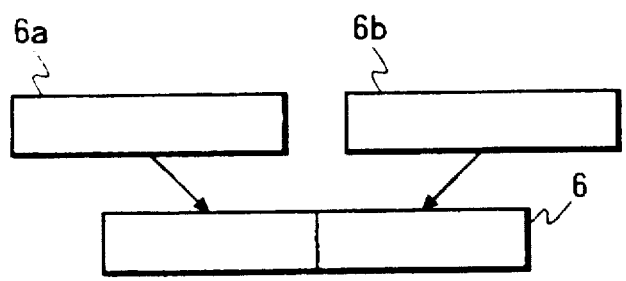

FIGS. 2A and 2B show a means for realizing the interpolation method for a position or angle signal shown in FIGS. 1A to 1G, FIG. 2A being a block diagram of an apparatus, and FIG. 2B representing the construction of a detection signal.

In FIG. 1A, the reference characters a and b designate two periodic signals differing in phase by 90° from each other, and more particularly position or angle signals obtained from a detector. The A-axis represents the amplitude value of the periodic signal a, and the B-axis represents the amplitude value of the periodic signal b. The axis of abscissas represents the rotational angle θ of the detector. It is to be understood that these periodic signals are normalized and are vibrating within a range of ±1 about zero (0).

When as shown in FIG. 1C, the amplitudes of the periodic signals a and b are described with the B-axis and the A-axis taken as the axis of ordinates and the axis of abscissas, respectively, there can be described a circle 1 representative of a phase. In the present embodiment, ¼ periods each are interpolated, and numerals in the circle 1 indicate the order of areas in a period.

Interpolation data corresponding to ¼ period corresponding to the amplitude ratio between the two periodic signals are prestored in a table 2. In the present embodiment, the number of the interpolation data in the table 2 is 128 and the interpolation number for each one period is 512.

Here, the contents of the table are such that the value of an inverse tangent function is developed. Now, the inverse tangent function suddenly approximates to the horizontal with 45° as the boundary. Therefore, an attempt to hold 0° to 90° in one table would require a great capacity of the table.

FIG. 1D is a graph in which the table of 0° to 90° when 512 is interpolated is taken with the interpolation value as the axis of ordinates and the index as the axis of abscissas.

So, in the table, A/B is developed as index from 0° to 45°, and as to 45° to 90°, a value holding B/A as the index is changed to (the interpolation value-the value of an inverse tangent function corresponding to 45°), and these are held in two tables. Any one of the tables is suitably referred to with 45° as the boundary. The table at this time assumes such a form as shown in FIG. 1F when the interpolation value and the index are taken as the axis of ordinates and the axis of abscissas, respectively. Also, such use of a value less than 1 does not require the shifting process in the digital signal processing of the fixed decimal point type and therefore leads to the advantage that the processing procedure can be remarkably simplified.

FIG. 1E represents the format at this time. In FIG. 1E, (1) shows the state of the value after calculation and the most significant bit S represents the sign. The position of arrow represents the decimal point. Assuming that the hatched portion is the length of the table to be referred to, it corresponds to 10 bits when for example, the length of the table is 1024. When this is shifted so as to be arranged from the least significant bit as shown by (2) in FIG. 1E, if as the index, the table is referred to, there can be obtained an inverse tangent function value, i.e., an interpolation value.

In FIG. 2A, the periodic signals a and b from an encoder 3 which is a detector are converted from analog signals into digital signals by AD converters 4a and 4b, respectively, and are sent to digital signal processing means 5. In the digital signal processing means 5, the amplitude ratio between the two periodic signals is calculated, whereafter a corresponding address is deduced from the value of the amplitude ratio, and the interpolation value of ¼ period is obtained by reference to interpolation data stored in the table 2.

When the magnitude relation between the two periodic signals A and B is B<A, that is, in the case of 0° to 45°, 90° to 135°, 180° to 225°, and 270° to 315°, FIG. 1F is referred to with B/A as the index. In the other areas, FIG. 1G is referred to with A/B as the index. As a result, values of 0 to 128 can be obtained as the interpolation value of ¼ period. This is a second calculated value.

In FIG. 2B, a first calculated value 6a counts the number of ¼ periods from a certain reference point with ¼ period as a unit, and is added to a second calculated value 6b which is the interpolation value of ¼ period, whereby there can be obtained a position or angle detection signal 6.

As shown in FIGS. 1A and 1B, one of the periodic signals such as a and b crosses the reference value (the median, or zero (0) when normalized) at each ¼ period and therefore, from the relation between the signs of this reference value and the two periodic signals, there can be found the first calculated value 6a which counts ¼ periods. These calculations are also effected by the digital signal processing means 5.

In the construction as described above, to find a position or an angle, calculation can be done as follows by the use of the first calculated value 6a and the second calculated value 6b obtained in the manner described above.

The first calculated value 6a of a position or an angle i*a weight coefficient+the second calculated value 6b, i.e., a value obtained by multiplying the first calculated value 6a by a weight coefficient determined by the number of interpolation data, and the second calculated value 6b are added together, whereby there can be obtained a detection signal 6 which is a position or angle signal from the reference point at interpolated accuracy.

When the combination has changed skipping over the order of the state transition, it can also be judged that some abnormality has occurred. Such function of judging the direction of movement and the function of judging abnormality can also be simply realized by the digital signal processing means 5.

While the first calculated value 6a can also be realized by the use of a comparison circuit and a coefficient device circuit, the offset or gain correcting function and the filter function, besides the function of judging abnormality, can also be incorporated by processing the first calculated value 6a by the digital signal processing means 5.

As described above, in the method of the present embodiment, positional information can be obtained by a sum-of-product calculation comprising multiplication and addition without classification by case being done depending on the areas of the phases of the periodic signals. The sum-of-product calculation can be accomplished at a very high speed by digital signal processing and is therefore convenient for making the performance of a positioning apparatus higher, such as shortening the sample time.

Also, the ratio between the two periodic signals is calculated and an interpolation value is obtained from an address (index) corresponding to the value of the ratio and therefore, in the method of the present embodiment, the capacity of the table can be made small as compared with a method of finding an interpolation value from two addresses (indices) corresponding to two periodic signals.

Further, the use of the ratio between the periodic signals is normalized relative to amplitude fluctuation and will therefore not affect the accuracy of interpolation even when the amplitude is uniformly varied by the deterioration of a light source, the fluctuation of a power source voltage, etc.

Specifically, assuming that when for example, the current phase is in the third area in the first round, the ratio between the two periodic signals is found and 7 has been obtained as the second calculated value 6b from the interpolation data in the table 2, the interpolated position or angle signal is 2 (the first calculated value)*128 (weight coefficient)+7 (the second calculated value)=263.

Also, assuming that when the current phase is in the third area in the second round, 4 has been obtained as the second calculated value 6b, the interpolated position or angle signal is 6 (the first calculated value)*128 (weight coefficient)+4 (the second calculated value)=772.

In the digital signal processing means 5, processing is effected by a binary number comprising a combination of 0 and 1 and therefore, when the number of interpolation data is a power of 2, the second calculated value 6b can be contained just enough in a number of digits required by the number of interpolation data. That is, when the second calculated value 6b increases by 1 after all digits have become 1 in digital expression, all the digits of the second calculated value 6b become 0 and the first calculated value 6a increases by 1. In such a case, by substituting the first calculated value 6a for the more significant digits and substituting the second calculated value 6b for the less significant digits, the detection signal 6 can be obtained without multiplying the first calculated value 6a by a weight coefficient.

Also, the combination of the variations in the signs of the periodic signals a and b, i.e., the order of the state transition, is determined by the direction of movement, as shown in FIG. 1B. Accordingly, if the transition of the signs is observed, the direction of movement of the position or angle can be known. Also, by using a digital signal processing element, in addition to the calculating function of finding the ratio between the two periodic signals and the function of detecting abnormality, additional functions such as the process of correcting the offset or the amplitude (gain), the process of correcting a phase error and the filter function can be given and therefore, there can be provided an apparatus of higher performance at lower costs.

When the number of interpolation data is a power of 2, multiplication can be substituted simply by the movement of digits and therefore, even the above-described sum-of-product calculation becomes unnecessary and a higher speed positioning process becomes possible.

(Second Embodiment)

Figure 3:
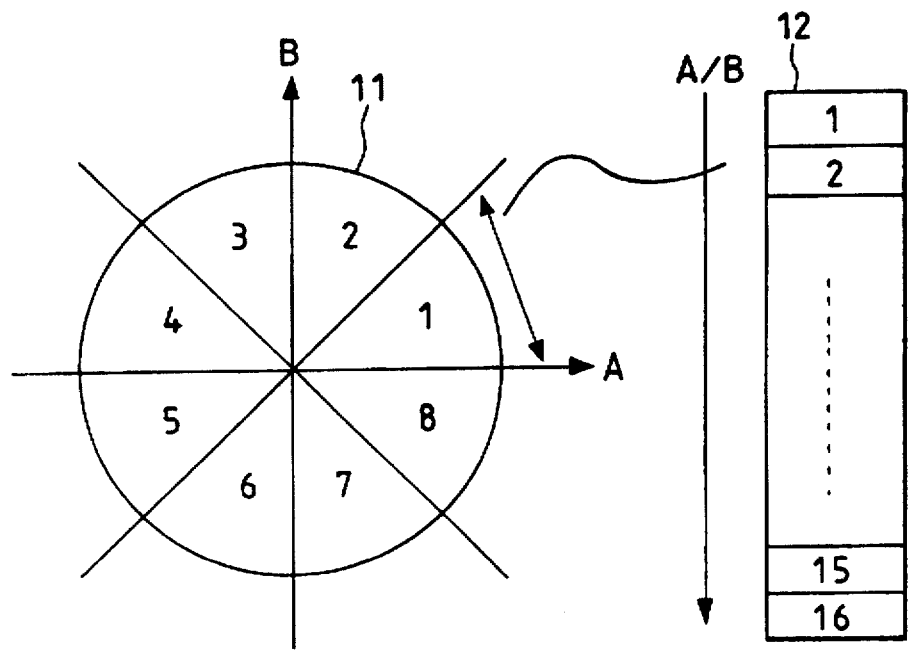
FIG. 3 shows a second embodiment of the interpolation method for a position or angle signal according to the present invention.
Figure 5:
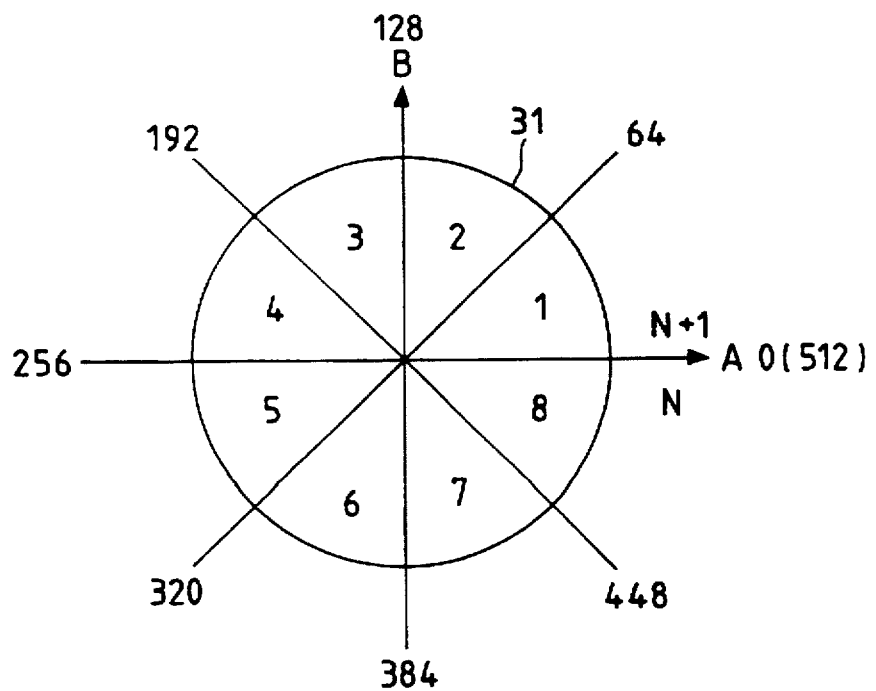
FIG. 5 shows an example of the interpolation method for a position or angle signal according to the art, and more particularly illustrates a method of interpolating a period by interpolation data corresponding to ⅛ period.
Figure 4B:
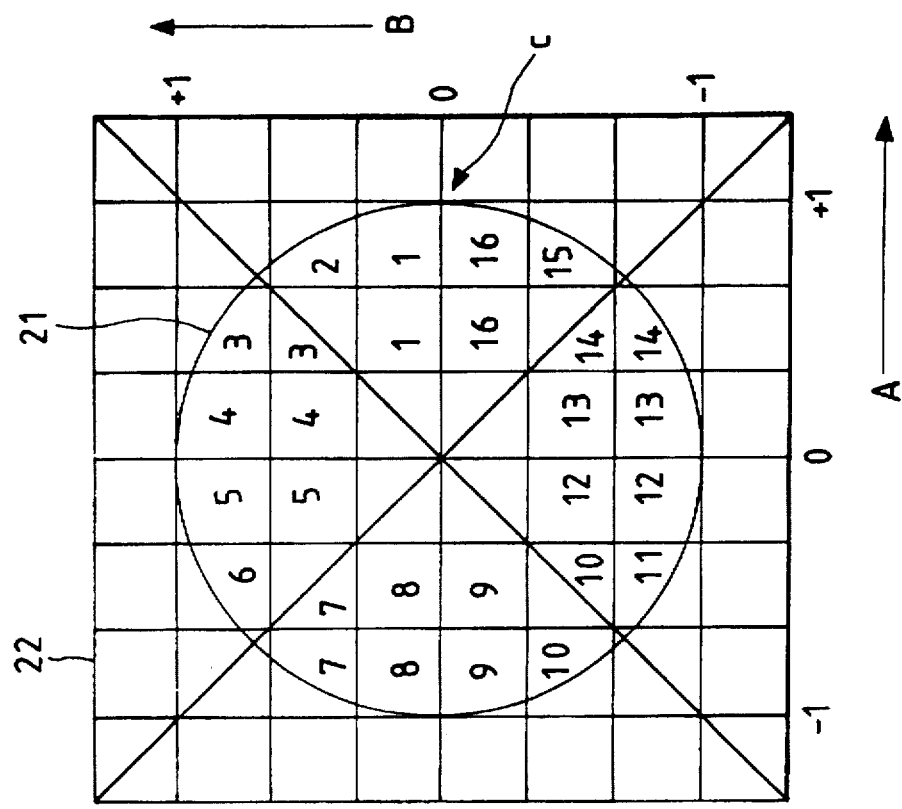
FIG. 4B illustrates an interpolation method having interpolation data corresponding to a period.
Figure 4A:
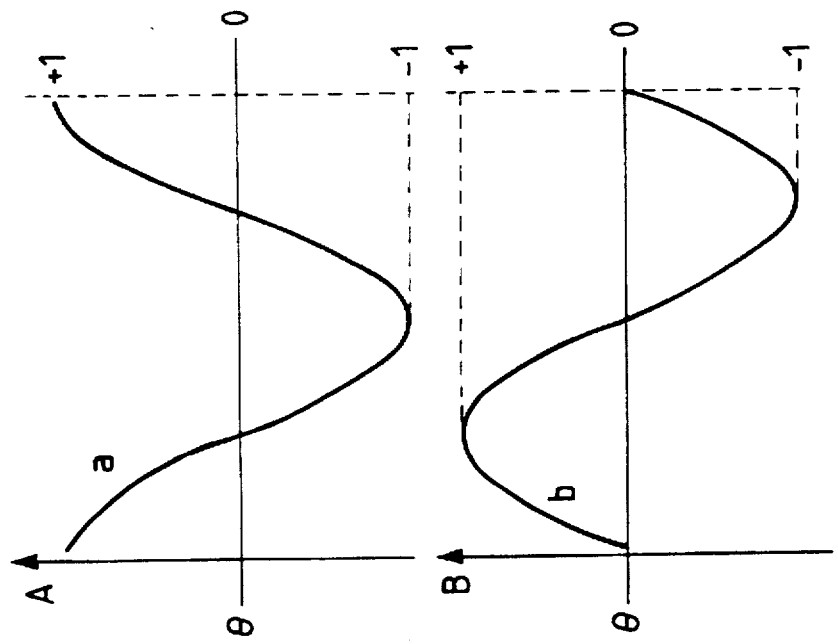
FIG. 4A shows an example of the interpolation method for a position or angle signal according to the conventional art.

FIG. 3 represents a second embodiment of the interpolation method for a position or angle signal according to the present invention.

In the first embodiment, the table is symmetrical with respect to the maximum point of the index and therefore, if the reference method is changed, the table can be reduced to half. That method will hereinafter be described.

In FIG. 3, a circle 11 represent phases obtained from two periodic signals as in the first embodiment, and numerals in the circle 11 each indicate what area in ⅛ period when a phase corresponding to a period is divided into eight. Also, in a table 12, there are prestored interpolation data for ⅛ period corresponding to the amplitude ratio between the two signals, and in the present embodiment, the number of the interpolation data in the table 12 is 16 and the number of interpolations for each one period is 128.

To detect the ⅛ period of the periodic signal, phases of which the absolute values are equal to each other can be calculated in addition to the time when one of the two periodic signals crosses zero (0). Also, as regards the function of judging abnormality, a state transition chart similar to that in the first embodiment is obtained by comparing the signs and magnitudes of absolute values of the two periodic signals.

In the other points, the method of the second embodiment is similar to the method of the first embodiment.

In such a method, even if the number of the interpolation data stored in the table 2 is the same as that in the first embodiment, the number of interpolations per period can be made twice as great as that in the first embodiment.

(Third Embodiment)

The interpolation methods described above premise that there is no offset of signals and the amplitudes of the signals are equal to each other and the phase difference between the signals is exactly 90°. If these premises break, the angle or displacement corresponding to a pulse of the result of interpolation will become unequal in value and accuracy will not be ensured.

With the encoder, it is difficult to completely adjust the amplitudes, offset and phases at the stage of manufacture and variations with time are unavoidable and therefore, to maintain the accuracy of the result of interpolation, some correction is necessary. It is desirable that the correction be done automatically without resorting to man power.

In the present invention, provision is made of analog-to-digital converting means and the interpolation value is found by digital signal processing and therefore, the other functions than the function of finding the interpolation value can be given.

Figure 6:
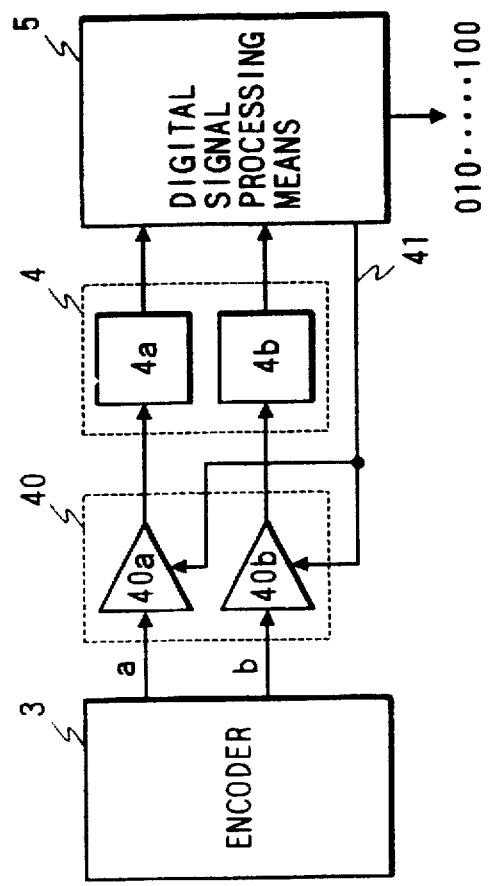
FIG. 6 shows a third embodiment of the present invention.

FIG. 6 shows a third embodiment of the present invention and illustrates the correction of amplitudes and offset.

The reference numeral 40 designates a signal amplifier capable of varying the amplification rate, and the reference numeral 41 denotes a signal determining the amplification rate.

Figure 7A:
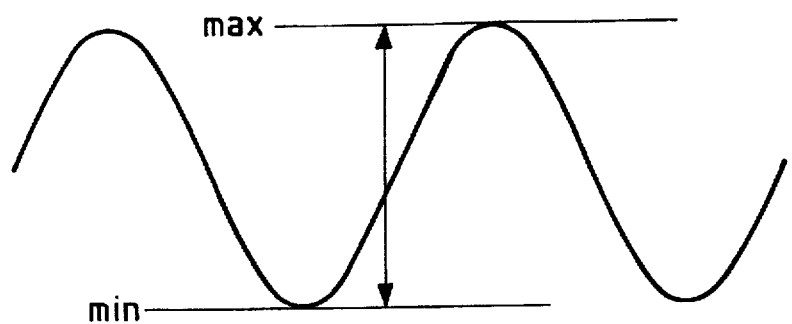
FIGS. 7A and 7B illustrate the amplitude correction of the present invention.

FIG. 7A is a graph illustrating the way of finding an amplitude correction coefficient.

First, the correction coefficient is set to a value smaller than a regular value, and the encoder is moved to thereby find a maximum value and a minimum value within a certain range. These operations are performed in digital signal processing means relative to the AD-converted digital amount. In the following description, it is to be understood that the central value of the signal is zero and the minimum value has the sign of minus.

The correction coefficient when adjustment to the amplitude of 80% of the full scale is desired can be found by:

Correction coefficient=(0.8*the amplitude of the full scale)/((maximum value-minimum value)/2).

The reason why a smallish correction coefficient is set during the measurement of the maximum and minimum values is that it is not saturated when the amplitude is greater than the standard.

If the amplification rate is set by this correction coefficient, both A phase and B phase will assume an amplitude of 80% of the amplitude of the full scale.

The purpose of giving allowance for 100% is to enable the center to cope with deviating from zero by offset.

It is also possible to carry out the amplitude correction in the digital signal processing means, but the amplitude correction is done before conversion in order to effectively use the range of AD conversion.

Figure 7B:
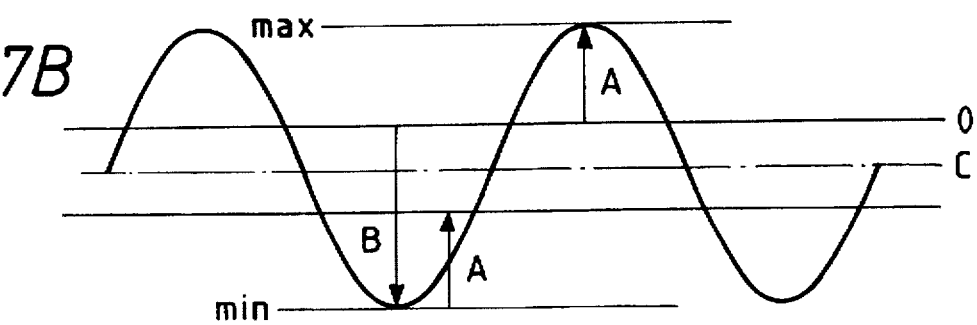

The offset correcting method will now be described. FIG. 7B shows a signal including offset. 0 deviates from the center. A indicates the maximum value and B indicates the minimum value. The maximum value+the minimum value represent the lower solid line in FIG. 7B, and a half of this is the center of the signal. Accordingly, the offset correction value can be found by:

Offset correction coefficient=(maximum value+minimum value)/2.

As regards offset correction, after AD conversion, the calculation of the correction coefficient is effected in the digital signal processing means.

Modified value=Converted value)−(offset correction value)

(Fourth Embodiment)

In the third embodiment, it has been described that the amplitude and offset can be corrected to desirable values, that is, can be normalized.

In the interpolation method of the present invention, the values of the two AD-converted signals are used as the base and therefore, it is also necessary to normalize the phase relation between the signals. Description will hereinafter be made of the normalization of the phase relation, i.e., the phase correction.

The following premises that the amplitude and offset are normalized, and this has already been described in the third embodiment and is therefore a reasonable premise.

Figure 8:
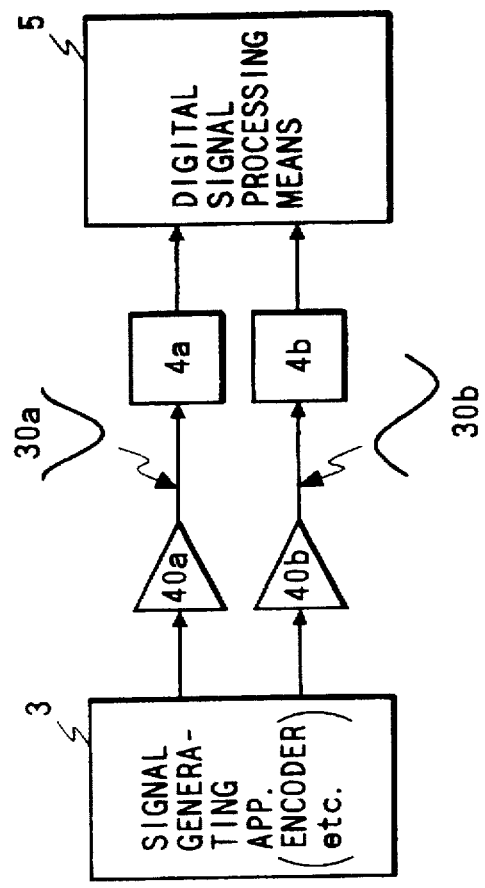
FIG. 8 shows a fourth embodiment of the present invention.

FIG. 8 shows the construction of a fourth embodiment of the present invention.

The reference numeral 3 designates a signal generating apparatus generating two periodic signals in conformity with a variation in the position or angle, for example, an encoder, the reference numeral 40 denotes a variable amplifier capable of varying the amplification rate by a signal from digital signal processing means and keeping the amplitudes of the signals from the signal generating apparatus 3 equal to each other, the reference numeral 30 designates periodic signals converted into electrical signals, the reference numeral 4 denotes AD converting means, and the reference numeral 5 designates digital signal processing means.

The variable amplifier 40 can calculate an appropriate amplification rate from the maximum and minimum values of the periodic signals 30 by the digital signal processing means 5.

Figure 9:
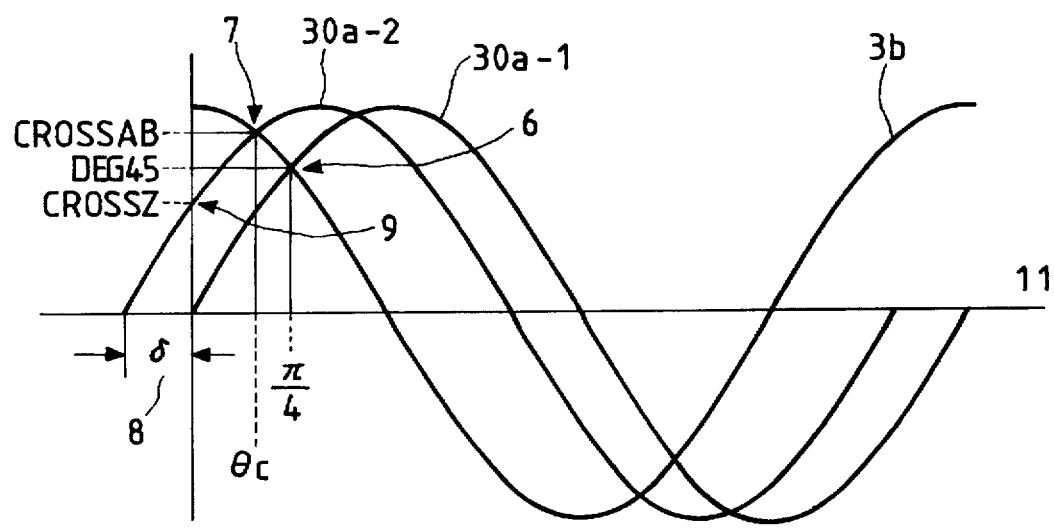
FIG. 9 illustrates the phase relation between two periodic signals.

FIG. 9 is a graph illustrating the phase relation between the two periodic signals 30, and the amplitudes of these signals are adjusted by the variable amplifier 40 so as to become equal to each other.

The reference character 30b designates a first periodic signal of the two periodic signals which is the reference, the reference character 30a-1 denotes a second periodic signal when there is no phase error, the phase difference of this second periodic signal from the first periodic signal being 90°, the reference character 30a-2 designates the second periodic signal when the phase error 8 is S, and the reference character 6 denotes a point of intersection when there is no phase error, this point of intersection assuming a sine or cosine value at 45° when the value of the maximum amplitude is 1.0 (this value is DEG45). The reference numeral 7 designates a point of intersection when there is a phase error 8, and this amplitude is CROSSAB.

The way of obtaining CROSSAB will first be described by the use of a flow chart.

These processes are carried out by the digital signal processing means 5 on the basis of the value converted into a digital signal by AD converting means in each predetermined sampling period.

Figure 10:
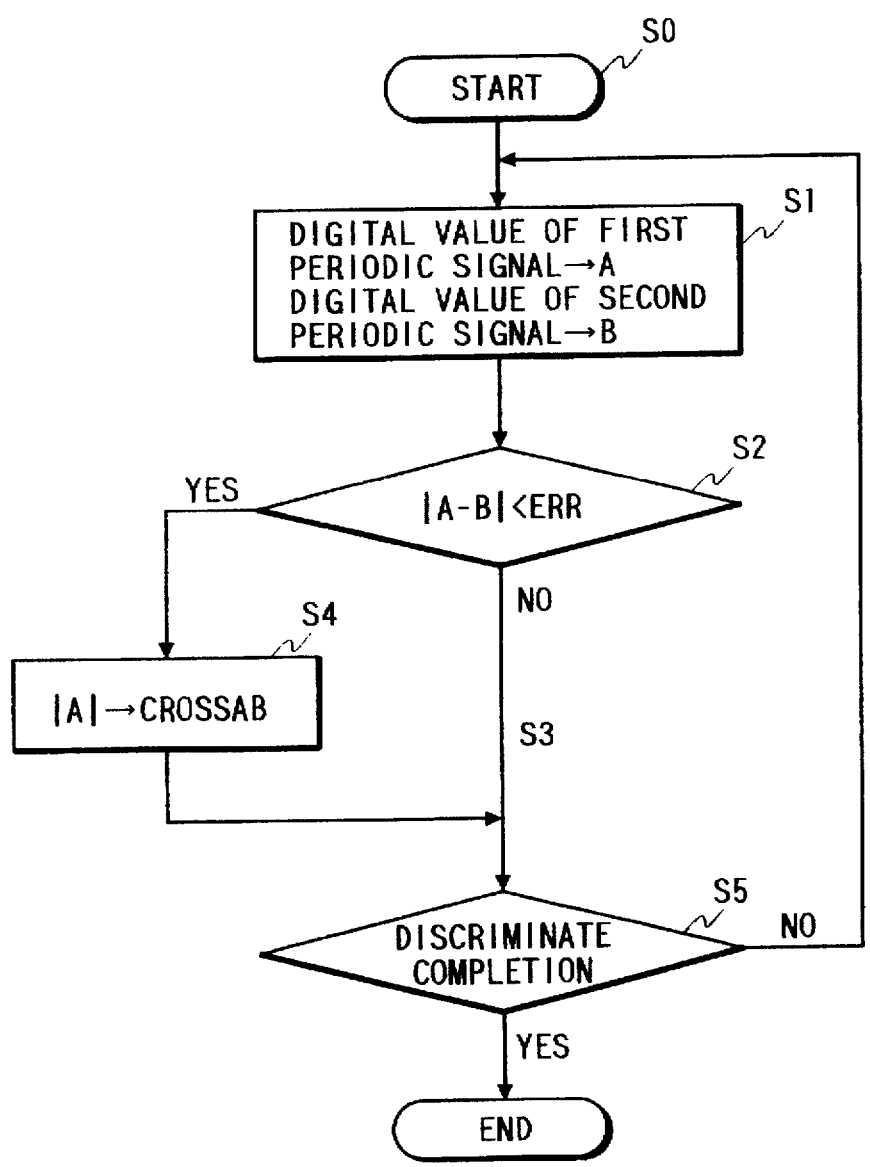
FIG. 10 is a flow chart for obtaining a point of intersection.

FIG. 10 shows a flow chart of a first method for finding the point of intersection.

At S0, the mode for detecting the point of intersection is entered. At S1, the digital converted values of the periodic signals are obtained during each sampling. At S2, the absolute value of the difference between the values of the two periodic signals is compared with a predetermined threshold value ERR. At S3, nothing is done because thereinto point of intersection when the absolute value of the difference is greater than ERR. At S4, the absolute value of the value of A or B is defined as the value CROSSAB of the point of intersection when the absolute value of the difference is smaller than ERR. At S5, the above-described operations are repeated until the mode for detecting the point of intersection is passed through.

The value of CROSSAB when the mode for detecting the point of intersection has been passed through is defined as the value of the point of intersection. In the mode for detecting the point of intersection the correction of the phase is not effected. That is, the phase difference is set to 0.

Figure 11:
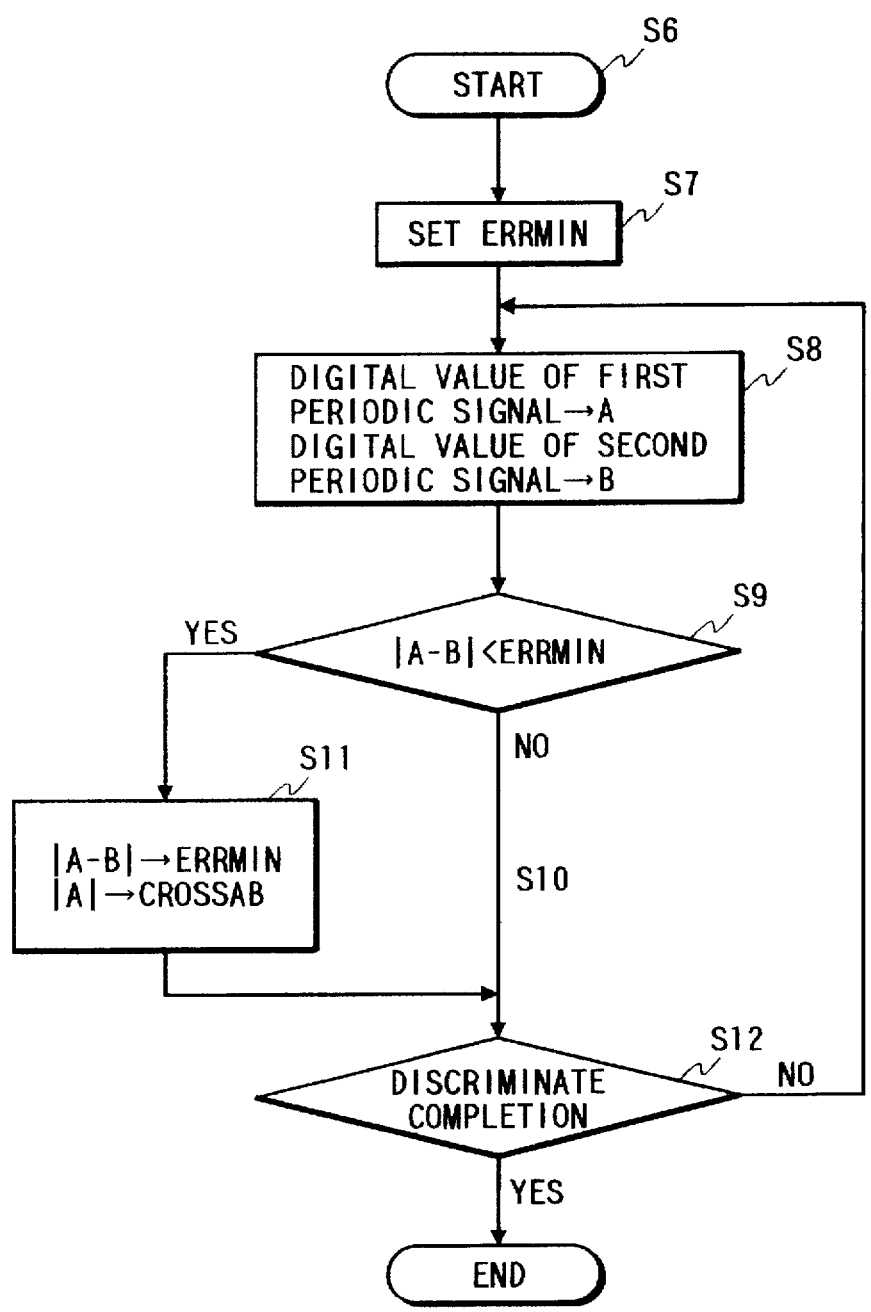
FIG. 11 is a flow chart for obtaining a point of intersection.

A second method of obtaining CROSSAB will now be described by the use of a flow chart shown in FIG. 11.

At S6, the mode for detecting the point of intersection is entered. At S7, a sufficiently great value is set as ERRMIN. At S8, the digital converted values of the periodic signals are obtained during each sampling. At S9, the absolute value of the difference is compared with ERRMIN. At S10, nothing is done because there is no point of intersection when the absolute value of the difference is greater than ERRMIN. At S11, when the absolute value of the difference is smaller than ERRMIN, the absolute value of the difference at this time is defined the value of new ERRMIN and the value of A or B is defined as CROSSAB. At S12, the processes from S8 are repeated until the mode for detecting the point of intersection is passed through. The value of CROSSAB when the mode for detecting the point of intersection has been passed through is defined as the value of the point of intersection.

Figure 12:
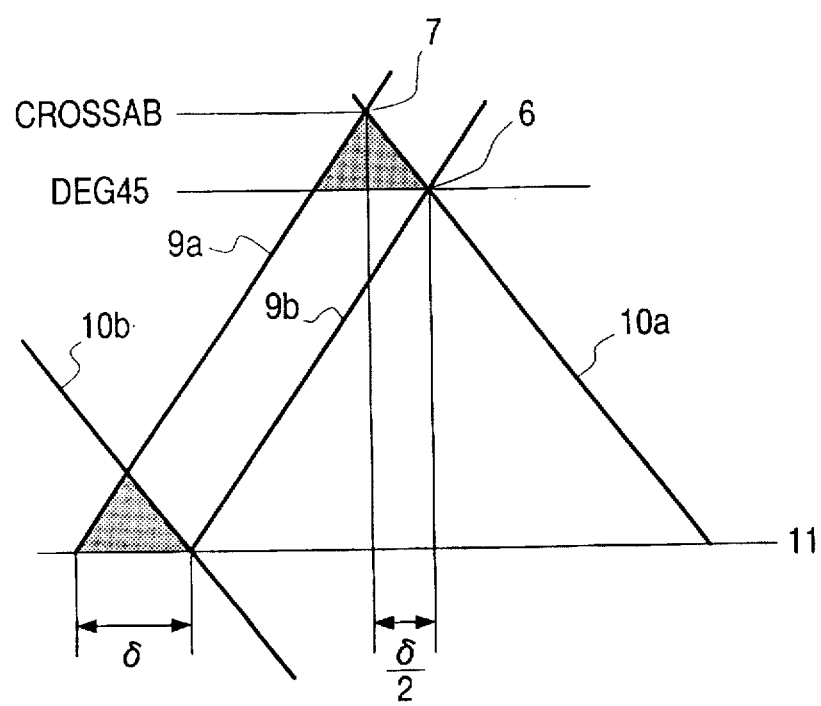
FIG. 12 is an illustration for obtaining a phase error.

A method of obtaining a phase error from the value CROSSAB of the amplitude of the point of intersection will now be described with reference to FIG. 12.

Straight lines when the periodic signals 30a-1, 30a-2 and 30b are line-approximated by a differential coefficient at 45° are defined as 9a, 9b and 10a, respectively.

When the value of the point of intersection 7 is CROSSAB, a half of the length of the base of a triangle surrounded by 9a, 9b and 10a can be obtained by $$\delta/2 = (CROSSAB - DEG45) + DEG45. \quad (1)$$

When a line parallel to 10a and passing through the point of intersection between the axis of abscissas 11 and 9b is defined as 10b, a triangle surrounded by 11, 10b and 9b and the triangle surrounded by 9a, 9b and 10a are the same and therefore, $\delta$ which is the length of the base, i.e., the phase error 8 can be found by doubling the value found by expression (1).

Description will now be made of a method of finding the periodic signal 30a-1 free of a phase error from the periodic signal 30a-2 having the phase error $\delta$.

3b is defined as $A = \cos\theta$, 3a-1 is defined as $B = \sin\theta$ and 3a-2 is defined as $B' = \sin(\theta + \delta)$.

Correcting the phase is making the measured value B' including a phase error into B free of a phase error. From the formula of a trigonometric function, B' can be decomposed as follows:

$$B' = \sin(\theta + \delta) = \sin\theta \cos\delta + \cos\theta \sin\delta = B\cos\delta + A\sin\delta \quad (2)$$

Accordingly, B can be obtained from the following expression by the use of $\sin\delta$ and $\cos\delta$ found from the measured values A, B' and the phase error $\delta$.

$$B = (B' - A\sin\delta) + \cos\delta \quad (3)$$

Accordingly, to effect correction, the values of the coefficients $\sin\delta$ and $\cos\delta$ must be obtained.

So, description will now be made of a method of finding the correction coefficients $\sin\delta$ and $\cos\delta$ from the phase error $\delta$.

By the utilization of the nature that $\sin\delta$ is substantially equal to $\delta$ when $\delta$ is in the vicinity of 0, $\sin\delta$ is approximated by $\delta$. From the relation that $\sin^2\delta + \cos^2\delta = 1$, $\cos\delta$ can be found by the calculation of $$\cos\delta = (1 - \delta^2)^{1/2}. \quad (4)$$

The calculation of the square root is done by the use of a function is the digital signal processing, by placing $\alpha = 1 - \delta^2$, and obtaining the solution of $x^2-\delta=0$ by repeating the approximate calculation of newton's method. As the frequency of repetition, a method of judging convergence and ending the repetition is usual, but when the presence and convergency of the solution are known so as to find the value of the square root and it is desired to terminate the calculation during the sampling period, the frequency of the repetitive calculation can be predetermined and the approximate calculation can be terminated when the calculation has been done by that frequency.

The approximate values of $\sin\delta$ and $\cos\delta$ found in the above-described manner are substituted for $\sin\delta$ and $\cos\delta$ of expression (3) to thereby effect phase correction. The approximate values of $\sin\delta$ and $\cos\delta$ which are the correction coefficients are constant values after the correction error $\delta$ has been found, and can therefore be sufficiently calculated during the sampling.

If the correction coefficients are stored (preserved) in a memory backed up by a battery or a non-volatile memory or the like, the correction error can be corrected by the last correction coefficients during the closing of a power source switch without the values of the correction coefficients being lost even if the power source switch is opened.

(Fifth Embodiment)

A fifth embodiment of the present invention will now be described. The construction of this embodiment is the same as that of the fourth embodiment. The two methods of finding the point of intersection in this embodiment are also the same as those in the fourth embodiment.

Description will hereinafter be made of the way of finding a phase error and so on with reference to FIG. 9.

The periodic signals when there is no phase error intersect each other at 45° and therefore, the phase at this time is $\pi/4$ radian. Likewise, the phase of the point of intersection when the phase error is $\delta$ is defined as $\theta c$.

To find the phase $\theta c$ of the point of intersection, an inverse trigonometric function of cosine is necessary. The inverse trigonometric function of cosine of about 45° is made into a table. In the table 1 of FIG. 13A, there is shown a case where the range of ±5° about 45° is covered. When the table 1 is referred to with the value of the point of intersection CROSSAB as the index, the phase $\theta c$ of the point of intersection can be found. The phase difference $\delta$ is obtained from the following expression:

$$\delta=(\theta c-\pi/4)*2 \tag{5}$$

Description will now be made of a method of obtaining a correction coefficient from a phase error.

The table has the relation between the sine and cosine of about 0°. The relation between the sine and the cosine is put into tables 2 and 3 shown in FIGS. 13B and 13C, respectively. These figures represent a case where a range up to ±5° is covered. With $\delta$ as the index, the values of $\sin\delta$ and $\cos\delta$ can be obtained from the tables. The capacity of the tables can also be reduced to half by the utilization of the symmetry of sin and cos with respect to 0° (sin is equal in absolute value and differs in sin, and cos is of the same value irrespective of the sin of $\delta$).

This value is substituted for expression (3) to thereby correct the phase.

The preservation of the correction coefficient can also be done in the same way as in the fourth embodiment.

(Sixth Embodiment)

The above fourth and fifth embodiments have been described with respect to a case where the calculation of the trigonometric function and inverse trigonometric function can not be done directly, but greater simplicity can be accomplished when the trigonometric function can be calculated. That case will hereinafter be described. The way of obtaining the point of intersection in this embodiment is the same as that in the fourth embodiment.

If the inverse trigonometric function can be calculated, the phase of the point of intersection can be calculated as $$\theta c=\cos^{-1}(CROSSAB) \tag{6}$$

and therefore, the difference between this value and 45° ($\pi/4$) corresponds to a half of the phase difference to be found and thus, it can be substituted for expression (5) to thereby find $\delta$.

The correction coefficient can also be obtained because $\sin\delta$ and $\cos\delta$ can be calculated.

Accordingly, if the values of $\sin\delta$ and $\cos\delta$ are applied to expression (3), the phase can be corrected.

The preservation of the correction coefficient can also be done in the same way as in the fourth embodiment.

In the fourth embodiment, description has been made of the method of finding both of the phase difference detection and the correction coefficient by approximate calculation, and in the fifth embodiment, description has been made of the method of obtaining the two by reference to the tables, and in the third embodiment, description has been made of the method of obtaining the two by a function, but it is of course also possible to effect the phase difference detection by reference to the tables and find the correction coefficient by approximate calculation or combine them arbitrarily to thereby realize it.

(Seventh Embodiment)

In the fourth to sixth embodiments, the phase error has been found from the point of intersection between two periodic signals, but in this embodiment, description will be made of a method of obtaining with one periodic signal as the reference, a phase error from the amplitude of the other periodic signal in a certain phase. Description will be made with reference to FIG. 9. It is to be understood that 30b is a reference signal. As an example, description will be made of a method of measuring the amplitude of 30a when the reference signal assumes an amplitude 1. The value of 30a when the phase error 8 is 0 is 0 as indicated by 30a-1. When the phase error is such as indicated by 30a-2, the value of the amplitude assumes a point indicated by 13 (the amplitude at this time is defined as CROSSZ). As described in the first to third embodiments, there are three methods of finding the phase error 8 from this CROSSZ.

Method 1

In the approximation by linearization, value of CROSSZ when the phase error is $\delta$ is $\sin\delta$ and therefore, the value of $\sin\delta$ is defined as an approximate value by approximation converse to the case described in the derivation of the correction coefficient of the fourth embodiment.

Method 2

The inverse trigonometric function of sine in the vicinity of 0° is had in the table, and with CROSSZ as the index, the table is referred to, thereby finding the value of $\delta$. The table is similar to the table of FIG. 13 and has 0° as the center in contrast with the table 1 which has 45° as the center.

Method 3

An inverse trigonometric function is calculated to obtain the phase error by the following expression:

$$\delta=\sin^{-1}(CROSSZ) \tag{7}$$

If the phase error $\delta$ is found by one of the above-described three methods, the correction coefficient can be derived by the method described in the fourth to the sixth embodiments and the calculation of phase correction can be executed.

The preservation of the correction coefficient can also be done as in the fourth embodiment.

The invention may be embodied in other specific forms without departing from the spirit or essential characteristics thereof. The above-described embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A displacement amount detecting method of detecting the amount of displacement of an object by the use of two periodic signals having a predetermined phase difference therebetween which are outputted in conformity with the displacement of said object comprising the steps of:

detecting said two periodic signals;

calculating the ratio between said two periodic signals; and obtaining the amount of displacement of said object from the value of said ratio by reference to prestored data, wherein said calculating step has the step of replacing denominator and numerator with each other so that said ratio may be less than 1 in conformity with the magnitudes of said periodic signals.

2. The method according to claim 1 wherein said prestored data have data corresponding to ⅛ period of said periodic signals.

3. The method according to claim 1, further comprising the step of making the amplitudes of said detected two periodic signals substantially equal to each other.

4. The method according to claims 1, further comprising the step of correcting the phases of said two periodic signals into said predetermined phase difference.

5. The method according to claim 1, wherein the number of said prestored data is a power of 2.

6. A displacement amount detecting method of detecting the amount of displacement of an object by the use of two periodic signals having a predetermined phase difference therebetween which are outputted in conformity with the displacement of said object comprising the steps of:

detecting said two periodic signals;

calculating the ratio between said two periodic signals; and obtaining the amount of displacement of said object from the value of said ratio by reference to prestored data, wherein the number of said prestored data is a power of 2.

7. The method according to claim 6, further comprising the step of making the amplitudes of said detected two periodic signals substantially equal to each other.

8. The method according to claim 6, further comprising the step of correcting the phases of said two periodic signals into said predetermined phase difference.

9. A displacement amount detecting apparatus for detecting the amount of displacement of an object by the use of two periodic signals having a predetermined phase difference therebetween which are outputted in conformity with the displacement of said object comprising:

means for detecting said two periodic signals;

means for calculating the ratio between said two periodic signals; and means for obtaining the amount of displacement of said object from the value of said ratio by reference to prestored data, wherein said calculating means has means for replacing denominator and numerator with each other so that said ratio may be less than 1 in conformity with the magnitudes of said periodic signals.

10. The apparatus according to claim 9, wherein said prestored data have data corresponding to ⅛ period of said periodic signals.

11. The apparatus according to claim 9, further having means for making the amplitudes of said detected two periodic signals substantially equal to each other.

12. The apparatus according to claim 9, further having means for correcting the phases of said two periodic signals into said predetermined phase difference.

13. The apparatus according to claim 9, wherein the number of said prestored data is a power of 2.

14. A displacement amount detecting apparatus for detecting the amount of displacement of an object by the use of two periodic signals having a predetermined phase difference therebetween which are outputted in conformity with the displacement of said object comprising:

means for detecting said two periodic signals;

means for calculating the ratio between said two periodic signals; and means for obtaining the amount of displacement of said object from the value of said ratio by reference to prestored data, wherein the number of said prestored data is a power of 2.

15. The apparatus according to claim 14, further having means for making the amplitudes of said detected two periodic signals substantially equal to each other.

16. The apparatus according to claim 14, further having means for correcting the phases of said two periodic signals into said predetermined phase difference.

* * * * *

UNITED STATES PATENT AND TRADEMARK OFFICE
CERTIFICATE OF CORRECTION

PATENT NO. : 5,719,789
DATED : February 17, 1998
INVENTOR(S) : Naoki Kawamata

It is certified that error appears in the above-identified patent and that said Letters Patent is hereby corrected as shown below:

COLUMN 1

Line 36, "counter-clockwisely" should read --counterclockwise--;
Line 59, "what areas in 1/8 period" should read --an area corresponding to one-eighth of a cycle--;
Line 61, "If here, in the area in what 1/8 period the current phase is" should read --If it is known which of these areas the current phase is in,--; and
Line 62, "known," should be deleted.

COLUMN 2

Line 5, "is" should read --is is--;
Line 6, "is" should read --is is--; and
Line 54, "and it may be required for positioning" should be deleted.

COLUMN 3

Line 32, "pase" should read --phase--; and
Line 46, "of" should read --of displacement of--.

UNITED STATES PATENT AND TRADEMARK OFFICE
CERTIFICATE OF CORRECTION

PATENT NO. : 5,719,789

DATED : February 17, 1998

INVENTOR(S) : Naoki Kawamata

It is certified that error appears in the above-identified patent and that said Letters Patent is hereby corrected as shown below:

COLUMN 7

Line 40, "represent" should read --represents--;
Line 42, "what area in 1/8 period" should read --an area corresponding to one-eighth of a cycle--; and
Line 67, "break" should read --do not hold--.

COLUMN 8

Line 60, "Converted" should read --(Converted--.

COLUMN 10

Line 61, "sin2$\delta$+cos2$\delta$" should read --$\sin^2\delta+\cos^2\delta$--; and
Line 67, "is the" should read --known in--.

UNITED STATES PATENT AND TRADEMARK OFFICE
CERTIFICATE OF CORRECTION

PATENT NO. : 5,719,789
DATED : February 17, 1998
INVENTOR(S) : Naoki Kawamata

It is certified that error appears in the above-identified patent and that said Letters Patent is hereby corrected as shown below:

COLUMN 11

Line 2, "newton's" should read --Newton's--
and "As" should read --As regards--; and
Line 57, "sin" should read --sign--.

COLUMN 12

Line 7, "cos-1" should read $--\cos^{-1}--$.

COLUMN 13

Line 33, "claims" should read --claim--.

Signed and Sealed this

Fifteenth Day of September, 1998

Attest:

BRUCE LEHMAN

Attesting Officer

Commissioner of Patents and Trademarks